US010674587B2

(12) United States Patent
 Sinitsyn et al.

(10) Patent No.: US 10,674,587 B2
(45) Date of Patent: Jun. 2, 2020

(54) CONTROL SYSTEM FOR A SURVEILLANCE SYSTEM, SURVEILLANCE SYSTEM AND METHOD OF CONTROLLING A SURVEILLANCE SYSTEM

(71) Applicant: SIGNIFY HOLDING B.V., Eindhoven (NL)

(72) Inventors: Alexandre Georgievich Sinitsyn, Eindhoven (NL); Annemarie Paulien Buddemeijer-Lock, Eindhoven (NL); Tom Verhoeven, Eindhoven (NL); Judith Hendrika Maria De Vries, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/340,488

(22) PCT Filed: Oct. 5, 2017

(86) PCT No.: PCT/EP2017/075381
 § 371 (c)(1),
 (2) Date: Apr. 9, 2019

(87) PCT Pub. No.: WO2018/069154
 PCT Pub. Date: Apr. 19, 2018

(65) Prior Publication Data
 US 2019/0246477 A1   Aug. 8, 2019

(30) Foreign Application Priority Data

Oct. 11, 2016  (EP) .................................... 16193216

(51) Int. Cl.
 *H05B 47/105*  (2020.01)
 *H05B 47/11*   (2020.01)
 (Continued)

(52) U.S. Cl.
 CPC ......... *H05B 47/105* (2020.01); *G06T 7/0002* (2013.01); *G08B 13/194* (2013.01);
 (Continued)

(58) Field of Classification Search
 CPC .... G08B 13/194; G08B 13/196; Y02B 20/46; G06T 2207/10024; G06T 2207/20104;
 (Continued)

(56) References Cited

U.S. PATENT DOCUMENTS

2005/0168625 A1    8/2005  Fischell et al.
 2008/0074517 A1*   3/2008  Chung ................. H04N 5/2352
                                                              348/255
 (Continued)

FOREIGN PATENT DOCUMENTS

CN         101567966 A     10/2009
 DE     102014216366 A1 *    2/2016  ......... H05B 37/0227
 (Continued)

*Primary Examiner* — Dedei K Hammond
*Assistant Examiner* — Amy X Yang
(74) *Attorney, Agent, or Firm* — Daniel J. Piotrowski

(57) ABSTRACT

A surveillance system is presented that aims to improve image quality. The surveillance system comprises a plurality of lighting apparatuses comprising one or more lights; a surveillance imaging device arranged to capture image data of a monitored area illuminated by one or more of the lighting apparatuses; an image processor arranged to receive the image data from the surveillance imaging device, wherein the image data comprises a plurality of frames, and the image processor is arranged to analyse each frame of the image data to obtain an image quality parameter for each frame; and a controller arranged to determine a difference between a value of the image quality parameter for a current frame and a reference value of the image quality parameter, wherein if said difference is greater than a threshold value. The controller is arranged to repeat a process of: 1) controlling a lighting parameter of at least one of the plurality (Continued)

of lighting apparatuses so as to change illumination of the monitored area; and 2) determining a new difference between a value of the image quality parameter for a new current frame and the reference value of the image quality parameter; until said new difference is less than or equal to a threshold value.

13 Claims, 9 Drawing Sheets

(51) Int. Cl.
*G08B 13/194* (2006.01)
*G06T 7/00* (2017.01)
*G08B 13/196* (2006.01)
*H04N 5/235* (2006.01)
*H04N 7/18* (2006.01)

(52) U.S. Cl.
CPC ......... *G08B 13/196* (2013.01); *H04N 5/2354* (2013.01); *H04N 7/183* (2013.01); *H05B 47/11* (2020.01); *G06T 2207/10024* (2013.01); *G06T 2207/20104* (2013.01); *G06T 2207/30168* (2013.01); *G06T 2207/30232* (2013.01); *Y02B 20/46* (2013.01)

(58) Field of Classification Search
CPC . G06T 2207/30168; G06T 2207/30232; G06T 7/0002; H05B 37/0218; H05B 37/0227; H04N 5/2354; H04N 7/183
USPC .......................................................... 315/153
See application file for complete search history.

(56) References Cited

U.S. PATENT DOCUMENTS

| | | | |
|---|---|---|---|
| 2008/0180553 | A1 | 7/2008 | Hassan-Shafique et al. |
| 2008/0297611 | A1* | 12/2008 | Qiu ...................... H04N 5/2351 348/211.3 |
| 2009/0268023 | A1 | 10/2009 | Hsieh |
| 2010/0265064 | A1 | 10/2010 | Mayer et al. |
| 2011/0157417 | A1 | 6/2011 | Wang et al. |
| 2012/0300011 | A1* | 11/2012 | Moletti .............. H05B 37/0227 348/14.01 |
| 2015/0145421 | A1* | 5/2015 | Chung ............... H05B 37/0227 315/158 |

FOREIGN PATENT DOCUMENTS

| | | |
|---|---|---|
| GB | 2459506 A | 10/2009 |
| JP | 2010009874 A | 1/2010 |
| WO | 0074018 A1 | 12/2000 |
| WO | 2015039035 A1 | 3/2015 |

* cited by examiner

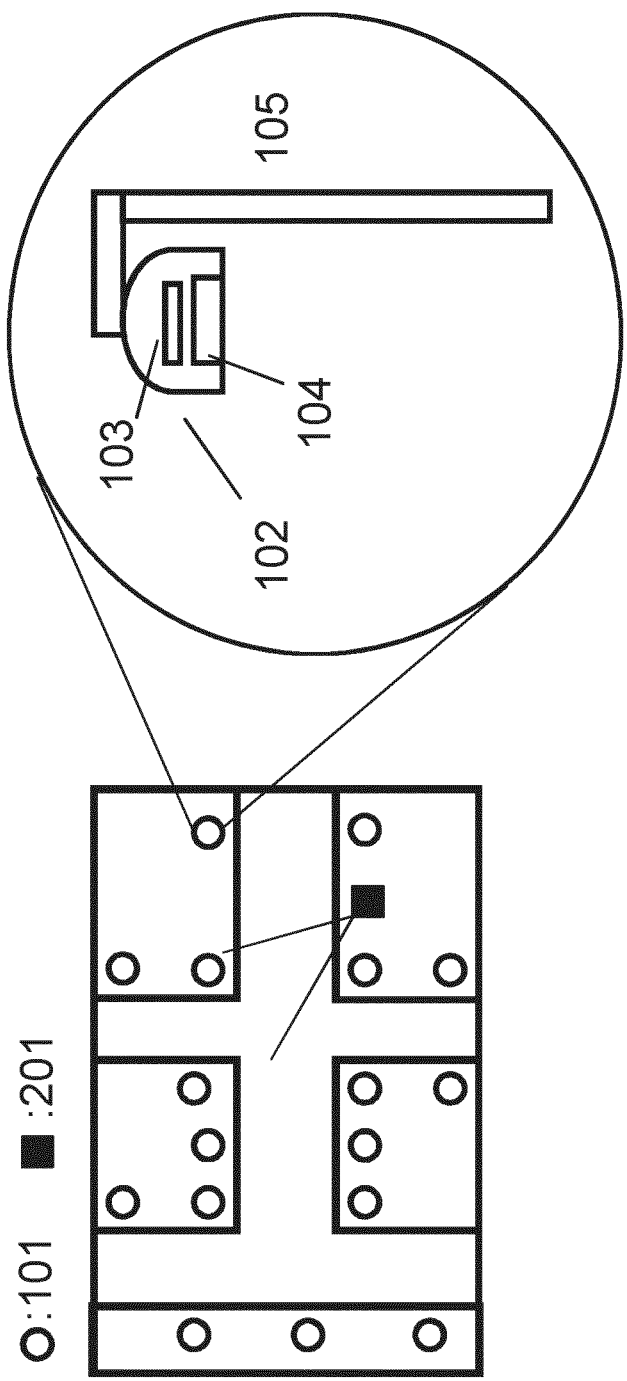

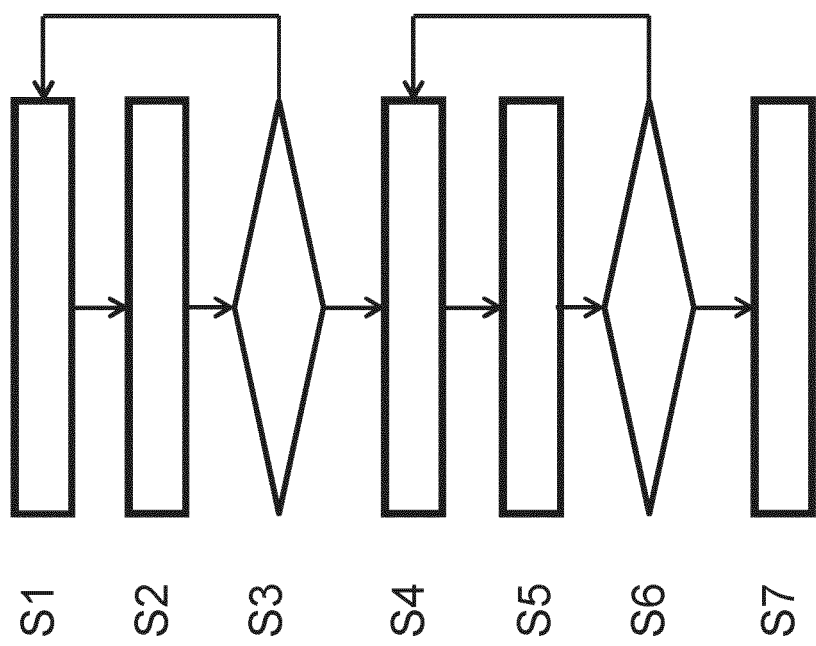

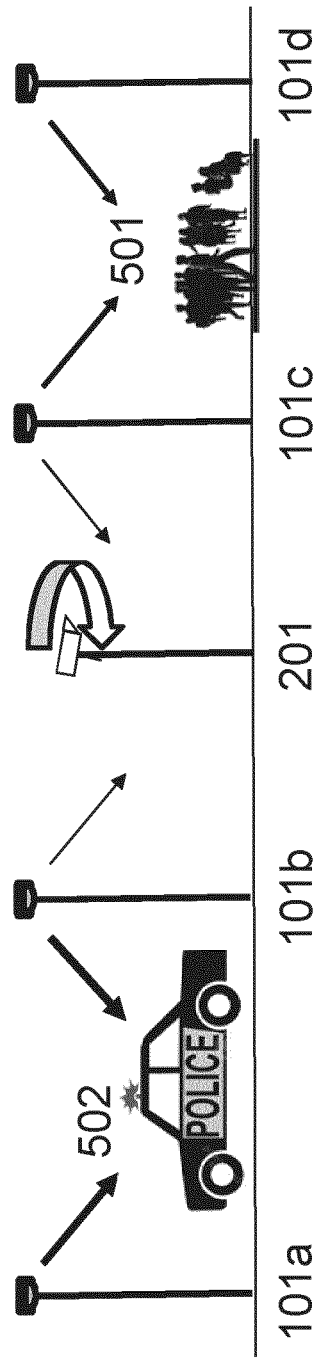

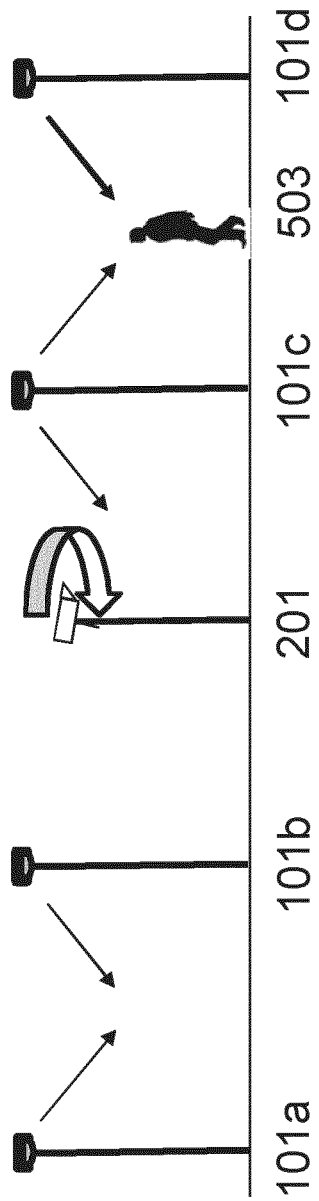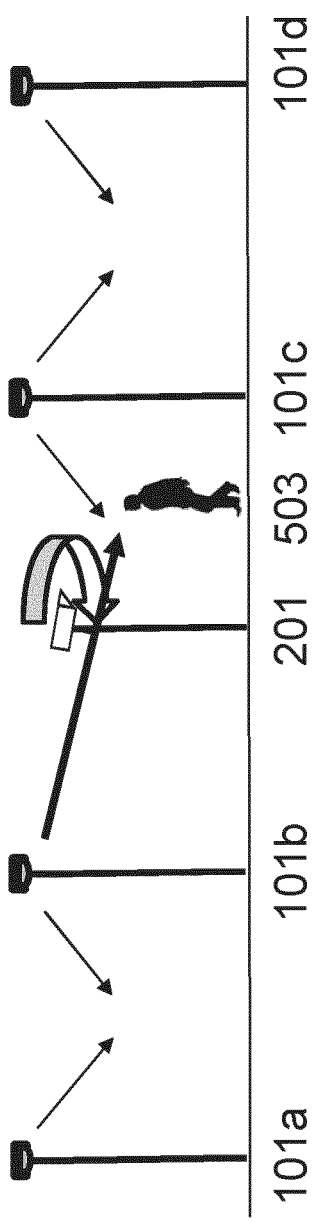

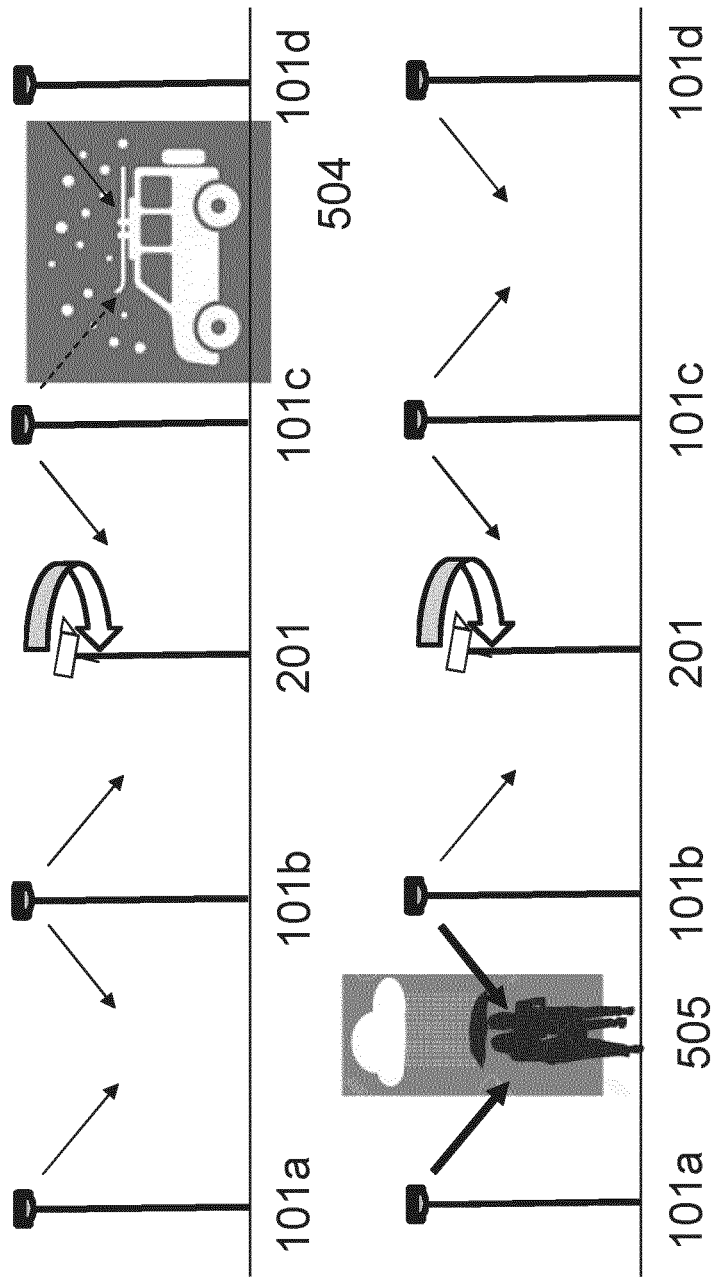

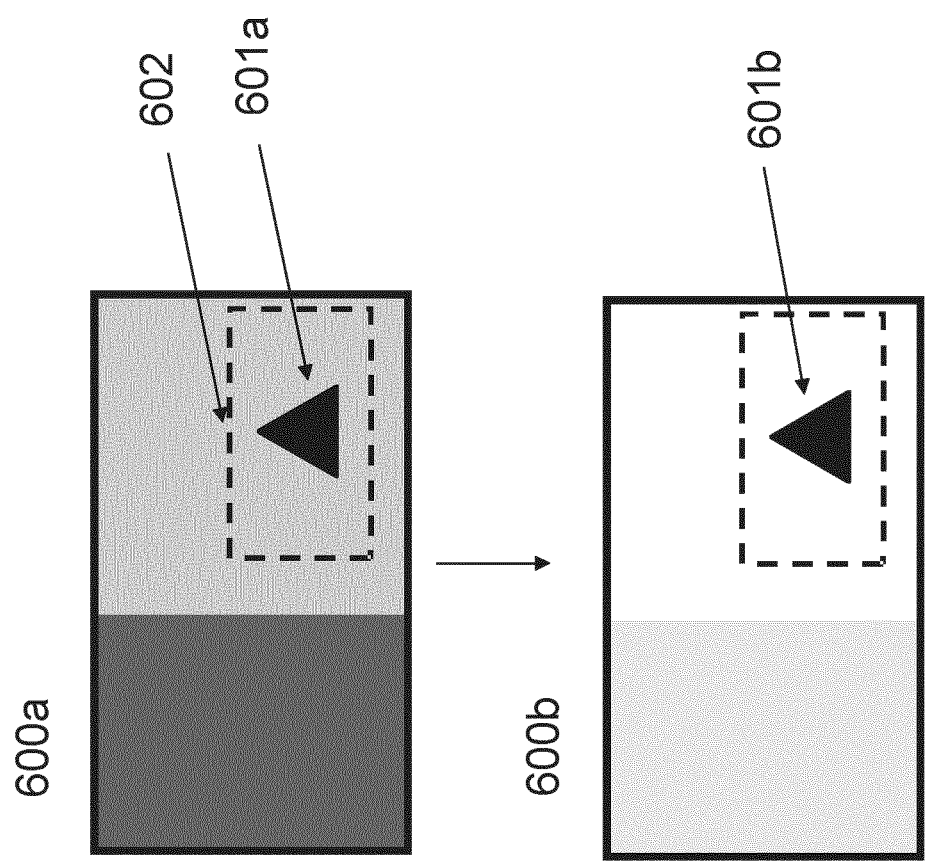

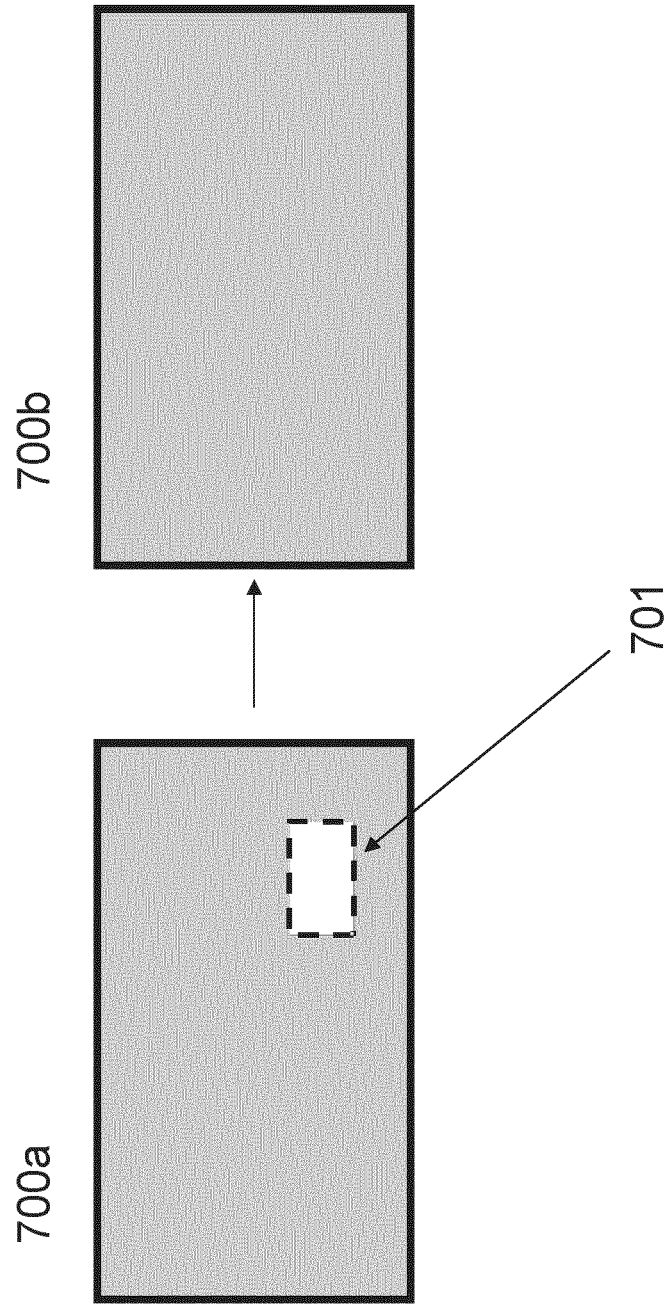

CONTROL SYSTEM FOR A SURVEILLANCE SYSTEM, SURVEILLANCE SYSTEM AND METHOD OF CONTROLLING A SURVEILLANCE SYSTEM

CROSS-REFERENCE TO PRIOR APPLICATIONS

This application is the U.S. National Phase application under 35 U.S.C. § 371 of International Application No. PCT/EP2017/075381, filed on Oct. 5, 2017, which claims the benefit of European Patent Application No. 16193216.5, filed on Oct. 11, 2016. These applications are hereby incorporated by reference herein.

FIELD OF THE INVENTION

The invention relates to a control system for a surveillance system, a surveillance system and a method of controlling a surveillance system.

BACKGROUND OF THE INVENTION

It is common for surveillance systems to be used to monitor areas. Such systems typically use a camera or a set of cameras, the outputs of which are displayed at a control room. Often one operator needs to observe many displays with multiple live camera streams. For efficient video surveillance good image quality is crucial. However, it is not always possible to provide good image quality.

It is an object of the invention to provide a surveillance system and method of controlling a surveillance system that overcomes problems associated with conventional devices.

US 2008/180553 A1 discloses a video imager used to measure the natural and/or artificial light levels in a space. These lighting estimates may be passed to a controller via a communication network. The controller may determine if and which areas of the space require more light or if and which areas of the space have more light than required. Based on the lighting estimates, the controller may issue commands to turn on/off or dim/brighten the light from various ones or combinations of light sources in or around the space via actuators.

DE 10 2014 216366 A1 discloses a system and a method for supervising an area by comparing the average brightness of an image of the supervised area as captured by a camera (e.g. a current image of the area) with a reference brightness (e.g. of a reference image of the area) and if the difference between the average brightness of the current image and the reference brightness of the reference image reaches or exceeds a threshold, then a lighting device is switched on. The system/method uses differential changes between subsequent images in a video stream to detect intrusion of objects in the supervised area and switches on the illumination when intrusion is detected.

US 2008/297611 A1 relates to desktop video sessions and discloses a video communication system including a computer program that implements a feedback control process for automatically controlling a light. The feedback control process may include receiving an image from a video camera and determining an initial difference between the received image and a stored image, e.g. related to a facial color tone map. If the difference between the captured image and the stored image exceeds a threshold, the feedback control process includes transmitting an optimization instruction to the light. This optimization instruction, when performed by the light, decreases the difference between the received image and the stored image.

SUMMARY OF THE INVENTION

According to an aspect of the present invention, there is provided a control system for a surveillance system comprising a lighting system comprising a plurality of lighting apparatuses including one or more lights and a surveillance imaging device arranged to capture image data of a monitored area illuminated by one or more of the lighting apparatuses, the control system comprising: an image processor arranged to receive the image data from the surveillance imaging device, wherein the image data comprises a plurality of frames, and the image processor is arranged to analyse each frame of the image data to obtain an image quality parameter for each frame; a controller arranged to determine a difference between a value of the image quality parameter for a current frame and a reference value of the image quality parameter, wherein if said difference is greater than a threshold value the controller is arranged to repeat a process of: sending to the lighting system control information for controlling a lighting parameter of at least one of the plurality of lighting apparatuses so as to change illumination of the monitored area; and determining a new difference between a value of the image quality parameter for a new current frame and the reference value of the image quality parameter; until said new difference is less than or equal to a threshold value.

For example, if the image quality is worsening with respect to previously measured quality (e.g. buffered for time) the controller can send commands to the at least one of the lighting apparatuses to adjust at least one lighting parameter change the illumination.

Hence, the image processor can analyse the image data received from the surveillance imaging device (e.g. including a video camera or the like) to determine the image quality of the images (e.g. those displayed in a control room). This information can be used by the lighting controller to control the lighting apparatuses so as to improve the image quality of the images. It will be appreciated that changing the lighting conditions for an area may cause the surveillance imaging device (e.g. a camera) to change its own capturing parameters (e.g. which may be automatically controlled via an algorithm). Hence, the lighting controller may control the lighting apparatuses so as to change the parameters of the surveillance imaging device (e.g. a camera).

The image quality parameter may comprise at least one of: a brightness value; a contrast value; a color balance value; and a shadow-contrast point value, a sharpness value, a noise value, a dynamic range value, a tone reproduction value, a colour accuracy value, a distortion value, an exposure accuracy value, a value indicative of lens flare. More generally, the image quality parameter may be any parameter of the image that can be determined by the image processor, an improvement of which can increase the usefulness of the captured images to a user.

The lighting parameter may comprise a control parameter arranged to control the one or more lights of an lighting apparatuses, wherein the lighting parameter is arranged to change at least one of: the overall light output; the beam shape of the light output; the color spectrum distribution of the light output; the flicker frequency.

The control system may be arranged to store light location information comprising the location of the area illuminated by each respective lighting apparatus and surveillance imaging device location information comprising information on the location of the monitored area; wherein the controller is arranged to compare the light location information with the surveillance imaging device location information to determine which of the plurality of lighting apparatuses affect the illumination of the monitored area; wherein the controller is arranged to send to the lighting system control information for controlling a lighting parameter of at least one lighting apparatus that affect the illumination of the monitored area.

The reference value of the image quality parameter may be a value of the image quality parameter representing a previous frame. The value of the image quality parameter representing a previous frame may comprise an average value of the image quality parameter for a predetermined number of previous frames.

The image processor may be arranged to select a portion of the image data of each frame, and wherein the image processor is arranged to obtain the image quality parameter for each frame based only on the portion of the image data.

The image processor may be arranged to receive a user selection of the portion of the image data.

The image processor may be arranged to analyse the current frame of the image data to detect if there is an object of interest in the current frame; wherein if an object of interest is detected in the current frame, a portion of the current frame comprising the object of interest is selected by the image processor as the portion of the image data for obtaining the image quality parameter.

The object of interest in the current frame may be detected using a suitable object detection algorithm.

In some embodiments, if the object of interest moves within a number of subsequent frames, the portion of the each frame comprising the region of interest may be different, and the image processor is arranged to select a new portion for each frame.

In some embodiments, if said difference is greater than a threshold value the controller is arranged to send to the lighting system control information for controlling a lighting parameter of at least one lighting apparatus that affects the illumination of an area corresponding to the selected portion of the image data.

Each lighting apparatus may be arranged to provide a plurality of different lighting conditions, and wherein the controller is arranged to send to the lighting system control information for controlling the lighting apparatuses to periodically cycle through the different lighting conditions so as to provide different illumination conditions for the monitored area.

The control system may further comprise a display arranged to display the captured image data of the monitored area. Hence, the image processor can analyse the image data received from the surveillance imaging device to determine the image quality of the displayed images. This information can be used by the lighting controller to control the lighting apparatuses so as to improve the image quality of the displayed images on the display.

It will be appreciated that in the context of control systems for surveillance applications, the surveillance location where a user watches the captured image data received from the surveillance imaging device on a display is typically located remote from the monitored area and the lighting apparatuses. Hence, also the control system for the surveillance system may be located remote from the monitored area and the lighting apparatuses illuminating the monitored area.

According to an aspect of the present invention, there is provided a control system for surveillance system comprising a plurality of lighting apparatuses comprising one or more lights and a surveillance imaging device arranged to capture image data of a monitored area illuminated by one or more of the lighting apparatuses, the control system comprising; an image processor arranged to receive the image data from the surveillance imaging device, wherein the image data comprises a plurality of frames, and the image processor is arranged to analyse each frame of the image data to obtain an image quality parameter for each frame; a controller arranged to determine a difference between a value of the image quality parameter for a current frame and a reference value of the image quality parameter, wherein if said difference is greater than a threshold value the controller is arranged to repeat a process of: controlling a lighting parameter of at least one of the plurality of lighting apparatuses so as to change illumination of the monitored area; and determining a new difference between a value of the image quality parameter for a new current frame and the reference value of the image quality parameter; until said new difference is less than or equal to a threshold value.

According to an aspect of the present invention, there is provided a surveillance system comprising: lighting system comprising a plurality of lighting apparatuses including one or more lights; a surveillance imaging device arranged to capture image data of a monitored area illuminated by one or more of the lighting apparatuses; an image processor arranged to receive the image data from the surveillance imaging device, wherein the image data comprises a plurality of frames, and the image processor is arranged to analyse each frame of the image data to obtain an image quality parameter for each frame; a controller arranged to determine a difference between a value of the image quality parameter for a current frame and a reference value of the image quality parameter, wherein if said difference is greater than a threshold value the controller is arranged to repeat a process of: controlling a lighting parameter of at least one of the plurality of lighting apparatuses so as to change illumination of the monitored area; and determining a new difference between a value of the image quality parameter for a new current frame and the reference value of the image quality parameter; until said new difference is less than or equal to a threshold value.

According to another aspect of the invention, there is provided a method of controlling a surveillance system comprising a plurality of lighting apparatuses comprising one or more lights, a surveillance imaging device, an image processor, and a controller; the method comprising: using the surveillance imaging device to capture image data of a monitored area illuminated by one or more of the lighting apparatuses; at the image processor, receiving the image data comprising a plurality of frames from the surveillance imaging device, and analysing each frame of the image data to obtain an image quality parameter for each frame; using the controller to determine a difference between a value of the image quality parameter for a current frame and a reference value of the image quality parameter, wherein if said difference is greater than a threshold value the controller is arranged to repeat a process of: 1) controlling a lighting parameter of at least one of the plurality of lighting apparatuses so as to change illumination of the monitored area; and 2) determining a new difference between a value of the image quality parameter for a new current frame and the reference value of the image quality parameter; until said new difference is less than or equal to a threshold value.

According to an aspect of the present invention, there is provided a computer readable medium carrying computer readable code for controlling a control system to carry out the method of any the aspects discussed herein.

Any of the above aspects of the present invention may be uses in relation to indoor lighting apparatuses or systems (for example for the surveillance of indoor areas such as event or concert halls, indoor sport arenas, conference/office areas etc.) and/or outdoor lighting apparatuses and systems (for example outdoor public places such as plazas, markets, streets, parking lots etc.).

BRIEF DESCRIPTION OF THE DRAWINGS

Embodiments of the invention will now be described, by way of example only, with reference to the accompanying drawings, in which:

FIGS. 1a and 1b are schematic views of a surveillance system according to an exemplary embodiment of the present invention;

FIG. 2 is a flow chart of a method according to an exemplary embodiment of the present invention;

FIG. 4 is a schematic view of an example operation of a surveillance system according to an exemplary embodiment of the present invention;

FIGS. 5a and 5b are schematic views of an example operation of a surveillance system according to an exemplary embodiment of the present invention;

FIGS. 6a and 6b are schematic views of an example operation of a surveillance system according to an exemplary embodiment of the present invention;

FIG. 7 is an illustration of a selection of a portion of an image; and

FIG. 8 is an illustration of a selection of a portion of an image.

DETAILED DESCRIPTION OF THE EMBODIMENTS

In the detailed description, the invention is described in relation to the monitoring of an outdoor areas illuminated with at least one outdoor lighting apparatus or system. However, the invention is not limited to outdoor applications and may also be used for surveillance of indoor areas.

Figure 1A:
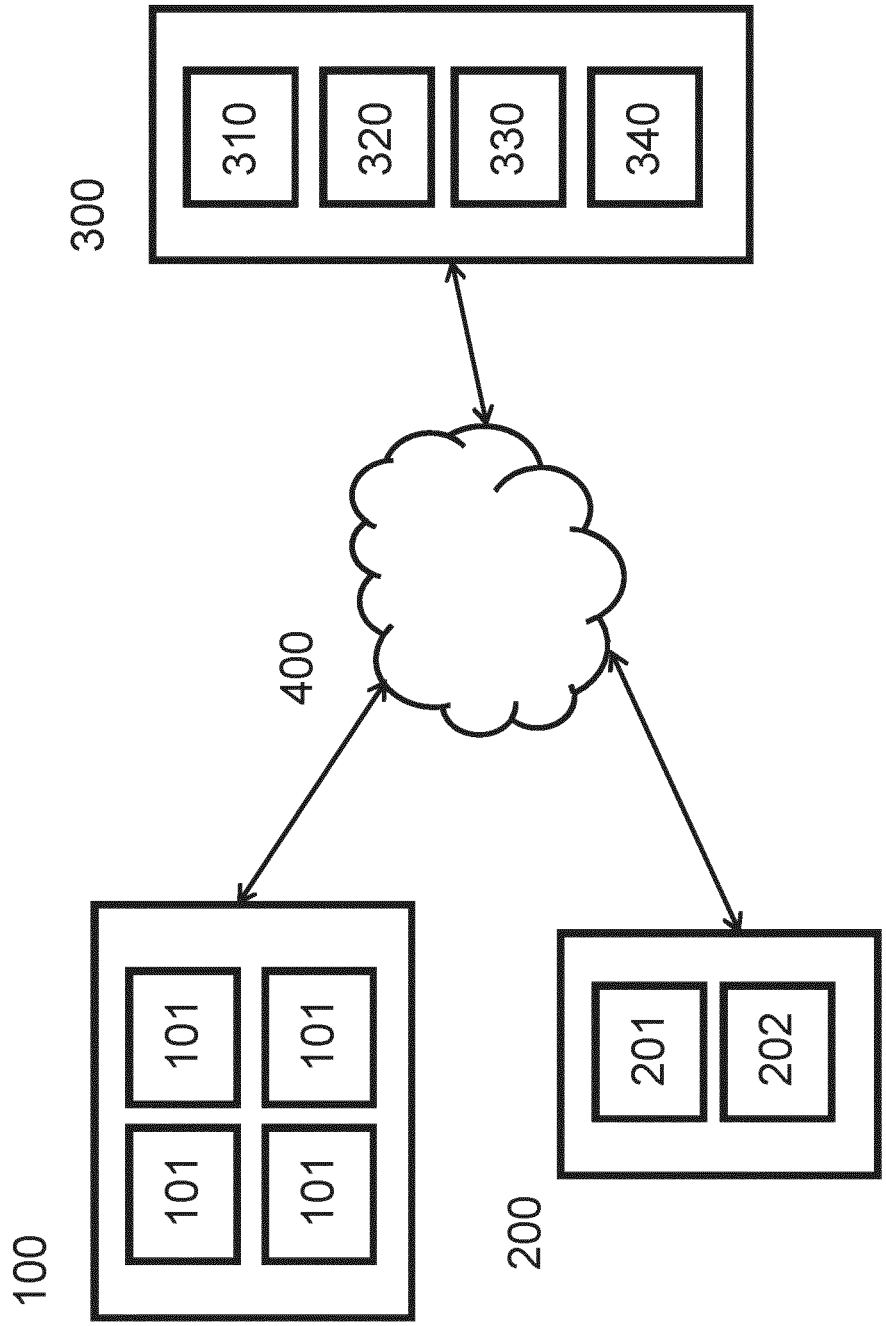

FIG. 1a shows a surveillance system according to a first embodiment of the invention.

The surveillance system comprises an outdoor lighting system 100, a surveillance imaging device 200 and a control system 300.

The outdoor lighting system 100 comprises a plurality of outdoor lighting apparatuses 101. Four outdoor lighting apparatuses 101 are shown in FIG. 1a, but this is purely as an example. FIG. 1b shows a plan view of an example street scene in which there are many outdoor lighting apparatuses 101. FIG. 1b also shows a schematic enlargement of one outdoor lighting apparatuses 101. As shown in more detail in FIG. 1b, an outdoor lighting apparatus 101 comprises a lighting unit 102 that includes a communications unit 103 and one or more lights 104. Furthermore, each outdoor lighting apparatus comprises a pole 105 on which the lighting unit 102 is mounted.

The surveillance imaging device 200 comprises a camera 201 and a communications unit 202. In this embodiment, the camera 201 is arranged to capture moving images (i.e. frames of video data) of a monitored area that is illuminated by the plurality of outdoor lighting apparatuses 101. As shown in FIG. 1b, the monitored area is the area viewable by the camera 201 at the current time. In some embodiments, the monitored area need not be illuminated by all the outdoor lighting apparatuses 101. Furthermore, in some embodiments, the camera 201 may be moveable (e.g. rotatable) so as to capture moving images of different monitored areas within a wider area. In other embodiments, the outdoor lighting apparatuses 101 may be controllable so as to change the area that they illuminate.

The control system 300 comprises a display 310, an image processor 320, a lighting controller 330 and a communications unit 340. The display 310 of the control system 300 may be located in a surveillance control room or other suitable location.

The outdoor lighting system 100 and the surveillance imaging device 200 are connected to the control system 300 via an appropriate network 400, e.g. via GPRS/3G/4G. Hence, the control system 300 can communicate with both the surveillance imaging device 200 and each of the outdoor lighting apparatuses 101. In this embodiment, this is done by there being a connection between the communications unit 103 of each outdoor lighting apparatus 101 and the network 400, and a connection between the communications unit 202 of the surveillance imaging device 200 and the network 400.

Images from the camera 201 are transmitted to the control system 300 via the communications units 202 and 340 using the network 400. Hence, in this embodiment, the moving images (i.e. video data) captured by the camera 201 can be displayed on the display 310. Images of the monitored area can therefore be viewed for surveillance purposes on the display 310 by an operator. Although not shown in FIG. 1a, it will be appreciated that in some embodiments, the images of the monitored area may be stored in a suitable storage (not shown) for later review.

As will be explained in more detail below, the image processor 320 can analyse the image data received from the camera 201 to determine the image quality of the displayed images. This information can be used by the lighting controller 330 to control the outdoor lighting apparatuses 101 so as to improve the image quality of the displayed images on the display 310.

A conventional surveillance system may comprise one or multiple cameras and/or any other sensors to detect changes in the observed area (e.g. microphone, radio signal strength measurement, presence detectors, thermal sensors, IR sensors, etc.); one or more sensor signal processing units and one or more displays to show information (e.g. live or recorded video stream, events like incidents); communication means to transfer data from cameras/sensors to displays (e.g. wireless or wired networks of all kinds).

A conventional connected lighting system may comprise of one or multiple light sources, one or more lighting control units; communication means to transfer control commands and data to/from light sources.

In this embodiment, the outdoor lighting system 100 and the control system 300 work together to improve visibility of the monitored area in the images displayed on the display 340 by controlling the illumination of the monitored area. It will be appreciated that the visibility of the monitored area in the images displayed on the display 340 will depend on contextual changes that influence visibility of the monitored area. Typical contextual changes that influence visibility of the monitored area are time of day (e.g. night vs. daylight), astronomy (e.g. moon position and phase), weather conditions (e.g. cloudiness, fog, rain, snow, ice), changes in number of people or other objects, changes in density of people or other objects, incidents (e.g. street fight, car crash, vandalism, fire, panic, aggression, etc.).

The surveillance system of the first embodiment uses the image processor 320 to monitor and recognize changes in the ambient light level using various video image processing techniques. Furthermore, the image processor 320 monitors and measures the image quality. In this embodiment, if the image quality is worsening with respect to previously measured quality (e.g. buffered for time) the lighting controller 330 sends commands to the at least one of the outdoor lighting apparatuses 101 to adjust at least one lighting parameter.

The image processor 320 receives image data from the camera 201, and analyses the image data to obtain an image quality parameter. The lighting controller 330 receives the obtained image quality parameter from the image processor 320, and determines whether there has been an adverse change in the image quality parameter compared to a previous point in time. If there has been an adverse change, the lighting controller 330 controls a lighting parameter of at least one of the plurality of outdoor lighting apparatuses 101 to change the illumination of the monitored area so as to improve the image quality parameter of the captured image data. Hence, in some embodiments, the lighting controller 330 controls a lighting parameter of at least one of the plurality of lighting units so as to change the illumination of the area so as to improve the image quality parameter of the captured image data back to its previous (i.e. before the change) state.

FIG. 2 shows a flow chart providing more detail on the operation of the surveillance system according to an exemplary embodiment of the invention.

As step S1, the outdoor lighting apparatuses 101 illuminate the monitored area with a first illumination condition. The first illumination condition represents the states of the lights of the outdoor lighting apparatuses 101 that illuminate the monitored area, and more detail on this is provided below. In general terms, the first illumination condition represents the type of lighting that the lights of the outdoor lighting apparatuses 101 are providing to the monitored area.

The first illumination condition may include the same lighting state for each outdoor lighting apparatuses 101 that illuminates the monitored area. Alternatively, the first illumination condition may represent a set of lighting states, with each outdoor lighting apparatuses 101 having an individual lighting state. In addition, the outdoor lighting apparatuses 101 may be arranged in groups, with each outdoor lighting apparatus 101 in each group having the same lighting state.

The image processor 320 receives image data comprising a plurality of frames from the camera 201, and analyses the frames of the image data to obtain an image quality parameter for each frame. At step S2, the image processor 320 analyses the current frame of the image data to obtain an image quality parameter for the current frame.

At step S3, the lighting controller 330 receives the image quality parameter for the current frame, and determines a difference between a value of the image quality parameter for the current frame and a previous value of the image quality parameter representing at least one previous frame. In this embodiment, the previous image quality parameter comprises an average value of the image quality parameter for a predetermined number of previous frames (e.g. an average of the last 10 frames). The image quality may be reviewed based on the frame rate (i.e. # frames per second) and adjusted accordingly. This may, in some embodiments, be limited to the dynamic range of the camera.

If the difference is less than or equal to a threshold value, then the image quality of the displayed image of the monitored area has not deteriorated compared to the previous frame(s). As a result, the method returns to step S1, and the monitored area is kept illuminated with the first illumination condition.

However, if the difference is greater than the threshold value, then the image quality of the displayed image of the monitored area has deteriorated compared to the previous frame(s). In this case, the method progresses to step S4.

At step S4, the lighting controller 330 controls a lighting parameter of at least one of the plurality of outdoor lighting apparatuses 101 so as to change the illumination condition of the monitored area. In this embodiment, this is done by the lighting controller 330 sending suitable control signals (i.e. control information) to the outdoor lighting apparatuses 101 so as to control the outdoor lighting apparatuses 101 to illuminate the monitored area with a new illumination condition. In other embodiments, this is done by the lighting controller 330 sending suitable control information to the lighting system 100 so as to enable the lighting system 100 to generate control signals used to control the outdoor lighting apparatuses 101 to illuminate the monitored area with a new illumination condition. Hence, the lighting controller 330 can either directly or indirectly control the outdoor lighting apparatuses 101.

Once the monitored area is illuminated with a new illumination condition, the image data of the monitored area received by the image processor 320 will change accordingly. At step S5, the image processor 320 analyses a new current frame of the image data to obtain a new image quality parameter for the new current frame.

At step S6, the lighting controller 330 receives the new image quality parameter for the new current frame, and determines a new difference between a value of the image quality parameter for the new current frame and a previous value of the image quality parameter. In this embodiment, the previous value of the image quality parameter is the value used in step S3.

If the new difference is less than or equal to the threshold value, then the image quality of the displayed image of the monitored area has been improved by the change in illumination. As a result, the monitored area is kept illuminated with the second illumination condition at step S7. The method can then progress back to step S1, using the second illumination condition in place of the first illumination condition.

However, if the difference is greater than the threshold value, then the image quality of the displayed image of the monitored area has not improved enough compared to the previous frame(s). In this case, the method progresses back to step S4. Steps S4, S5 and S6 can be repeated until the new difference is less than or equal to a threshold value.

The second illumination condition may include the same lighting state for each outdoor lighting apparatuses 101 that illuminates the monitored area. Alternatively, the second illumination condition may represent a set of lighting states, with each outdoor lighting apparatuses 101 having an individual lighting state. In addition, the outdoor lighting apparatuses 101 may be arranged in groups, with each outdoor lighting apparatus 101 in each group having the same lighting state.

In some embodiments, instead of comparing the image quality parameter for the current frame with a previous value of the image quality parameter for one or more previous frames, the image quality parameter for the current frame may be compared to a reference value of the image quality parameter. Hence, steps S3 and S6 could use a reference value instead of the previous image quality parameter.

In this embodiment, the lighting parameter comprises a control parameter arranged to control the one or more lights of an outdoor lighting apparatuses 101. The lighting parameter may be arranged to change at least one of:

the overall light output, light level or light intensity
the beam shape of the light output (e.g. wide angle vs narrow angle)
the direction of light output
the color spectrum distribution of the light output
the flicker frequency In other words, the lighting parameter may be any one or combination the following lighting control settings: light level, light spectral distribution, beam shape, light direction, dynamics.

Hence, the light levels, color temperature (e.g. by changing the color spectrum distribution), spot light scope (e.g. by changing the beam shape) or any other lighting parameter influencing visibility on the monitored area may be adjusted by at least one of the outdoor lighting apparatuses 101. Furthermore, by adjusting the lighting parameter, the light for an area can be adjusted to provide fill-in light (aligned) or contrast light (opposite). In addition, different results can be obtained using different flicker frequencies. For example, lower frequencies (e.g. <60 Hz) may be used to save energy/increase life time of lighting apparatuses, but they are inefficient when it comes to good quality night time imaging). Furthermore, the system can provide dynamic effects, e.g. by changing certain lighting parameters over time.

The process of monitoring, measuring image quality and adjusting may continue until an optimal setting is found when image quality cannot be improved any more by adjusting settings of the surrounding light sources.

The image quality parameter may relate to one or more parameters associated with the image quality of the image displayed on the display 310 or stored in a storage for later review, which image quality parameter can be influenced by changing the illumination of the monitored area. Examples of appropriate image quality parameters include:

Brightness
Contrast
color balance
shadow-contrast point
sharpness
noise
dynamic range
tone reproduction
color accuracy
distortion
exposure accuracy
lens flare It will be appreciated that that the quality of the image displayed on the display 310 will depend in part on the settings of the camera used to capture the image. In this regard, changing lighting parameters (i.e. changing lighting conditions) can influence the camera indirectly. For example, increasing the total light for an area will cause the camera to have a large lens aperture. A summary table of some effects of lighting control settings on the camera and for the observer is provided below.

TABLE 1

| Lighting control setting | Lighting effect on environment | Effect on camera | Visual effect for observer | Value for the observer |
| --- | --- | --- | --- | --- |
| Increase (from dimmed - to normal - to boost) the total light output (lumen output) | More light (lux) on environment, objects and persons | Larger lens aperture, better signal/noise ratio, higher/lower pixel resolution, better color quality, higher/reduced contrasts, adjusted dynamic range possible, higher frame rates | Sharper images, better zoom-in quality, better color recognition | Faster response to situation, faster facial recognition, better evidence quality (e.g. if the video is to be used in court) |
| Change the color (wavelengths) composition of the lighting (e.g. by using multi-arrays of colored LED's) | For example, switching from warm-white color scheme (e.g. 2000K, CRI = 60, e.g. with amber/white LEDs) to cool-bright color scheme (e.g. 4000K, CRI > 90, e.g. by switching on/boosting red-green-blue LEDs). IR and UV could even be used if needed. | Use different dynamic ranges, use/remove IR filter possible (in specific situations). Adjusted color sensitivity. Adjusted settings dependent on combination of daylight and artificial light. | Better color rendering | Better color recognition, faster response to situation, better object/person description (e.g. color of car, color of clothes) |
| Change from wide beam to spot light | Less light to the environment, more light on | For specific spot light: selected region of | Sharper images, better zoom-in quality, better color | Faster response to situation, faster facial |

TABLE 1-continued

| Lighting control setting | Lighting effect on environment | Effect on camera | Visual effect for observer | Value for the observer |
| --- | --- | --- | --- | --- |
| | objects or persons, more contrasts (might cause hindrance, draw attention to the people on the street) | interest: other dynamic range to be used. | recognition | recognition, better evidence quality (video to be used in court) |
| Change direction of the light (e.g. by rotation of a light beam, switching on/off part of the light output, changing by different lens arrangements) | Direction were the (majority) of the light comes from can be changed, e.g. lighting effect could be set on symmetrical or counter beam (i.e. from camera's point of view) | Either more light (luminance) from the object/person (symmetrical), or from the background (counter beam) | Either better zoom-in quality, better color recognition, or better contour/movement recognition | Faster facial recognition, better evidence quality (video to be used in court) or better dynamic tracking of moving objects or persons |
| Dynamic light effects (e.g. changing flicker frequencies) (lower frequencies (e.g. <60 Hz) may be used to save energy/increase life time of luminaire, but they are inefficient when it comes to good quality night time imaging) | Dynamic effects might be visible to the public (or not), could be flicker, could be flash light. | "Sync specific regions of interests with flash light. Sync shutter time with light frequencies, better signal/noise ratio, better color quality, higher contrasts. | Dynamic light effects (e.g. changing flicker frequencies) (lower frequencies (e.g. <60 Hz) may be used to save energy/increase life time of luminaire, but they are inefficient when it comes to good quality night time imaging) | Dynamic effects might be visible to the public (or not), could be flicker, could be flash light. |

Depending on the appropriate image quality parameter, the lighting parameter may be changed in different ways. For example, the lighting settings may be changed slowly. For example, the changes may be made in such a way that citizens do not notice it (e.g. within 5 min). As an example, if it is getting busier at a particular street, just for better surveillance the light level may be increased at normal changing/fading speed (e.g. change over within a few seconds). However, as another example, if there is a dangerous situation (e.g. accident) detected, immediately higher light levels are needed. Alternatively, a fast (<1 sec) changing of lighting conditions may be used to get an alerting effect/reaction. For example, if crowd is moving a certain direction and need to be stopped, a flash/bright light may be used to get a reaction.

In some embodiments, the user of the surveillance system (e.g. a law enforcement professional) may be watching the images displayed on the display 310. Using the above methods, the images displayed will have greater image quality as a result of the automatic adjusting of the illumination of the outdoor lighting apparatuses 101.

The advantages of the improved image quality on the display are: better visibility in monitoring areas, spotting potential incidents on an early stage, faster emergency response, less number of missing incidents, higher quality video recordings used as evidence in courts. This can have the following effects for observer: sharper images, better color recognition, better zoom-in quality, movements better detectable, better facial recognition, better evidence (photo/video footage).

In some embodiments, each outdoor lighting apparatus 101 is arranged to provide a plurality of different lighting conditions, depending on different lighting parameters. In such embodiments, the lighting controller 330 can be arranged to control the outdoor lighting apparatuses 101 to periodically cycle through the different lighting conditions so as to provide different illumination conditions for the monitored area. This can be done independently of the above mentioned image processing and lighting control to improve image quality.

In addition, it will be appreciated that each situation depends on complex combination of different parameters: time, location, topology, type of incident, weather, number of people, type of people, etc., and typically a human operator (e.g. a law enforcement professional) involved to control the system. The number of lighting parameters and different values is large, and from the point of view of human control, embodiments of the invention can provide a system that reduces the number of options for the operator to choose from (to reduce operation time) and allow the final decision to be made by the operator (to increase quality of service).

In some embodiments, the surveillance system may be arranged to store light location information comprising the location of the area illuminated by each respective outdoor lighting apparatus 101, as well as surveillance imaging device location information comprising information on the location of the monitored area. Such information is accessible by the lighting controller 330 and may be stored either in the control system 300 in a suitable storage (not shown) or on an external device.

The outdoor lighting apparatuses 101 may be able to provide illumination over different areas depending on the lighting parameters associated with them. Hence, the light location information for each outdoor lighting apparatus 101 may include a range of possible areas that can be illuminated. This information can be combined with information on the current status of each outdoor lighting apparatuses 101 (e.g. appropriate lighting parameters), enabling the surveillance system to determine which physical areas each outdoor lighting apparatus 101 is illuminating at any point in time.

Likewise, the camera 201 may be moveable, and the surveillance imaging device location information may include a range of possible areas that can be monitored. This information can be combined with information on the current status of the camera 201 (e.g. via suitable camera control parameters), enabling the surveillance system to determine which physical area the camera 201 is monitoring at any point in time.

In other words, in such embodiments, the surveillance system may store which real world areas are illuminated by which lights and which area of the real world corresponds to the monitored area. Hence, if the camera 201 moves (e.g. if it is rotated), then the real world area corresponding to the monitored area will change. As a result, it is possible that the monitored area will be illuminated by different outdoor lighting apparatuses 101. This is illustrated in FIG. 3.

Figure 3:
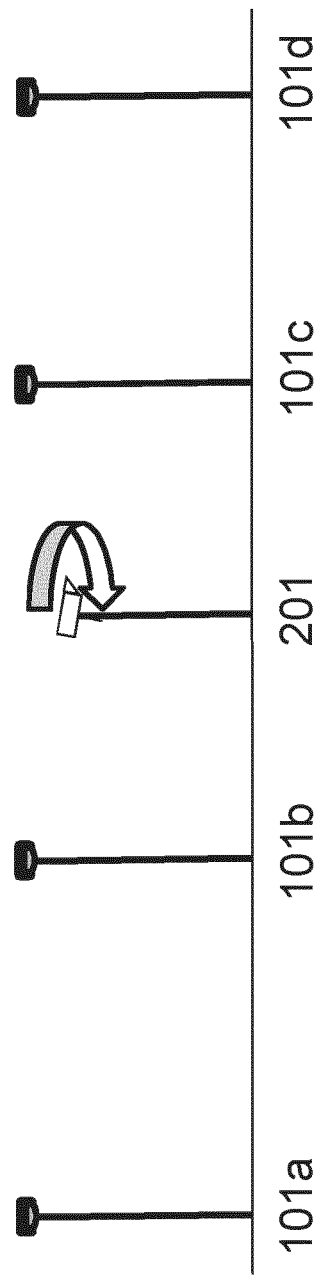
FIG. 3 is a schematic view of an example operation of a surveillance system according to an exemplary embodiment of the present invention.

FIG. 3 shows four outdoor lighting apparatuses 101a, 101b, 101c, and 101d, and a camera 201. As shown in FIG. 3, the camera 201 is facing to the right and so the monitored area will be primarily illuminated by outdoor lighting apparatuses 101c, and 101d. If the camera 201 rotates to the left, then the new monitored area will be primarily illuminated by outdoor lighting apparatuses 101a, and 101b.

By storing light location information and surveillance imaging device location information, the lighting controller 330 can determine which outdoor lighting apparatuses illuminate the monitored area or have the greatest influence on the illumination of the monitored area at any given time.

In some embodiments, at step S4, the lighting controller 330 is additionally arranged to compare the light location information with the surveillance imaging device location information to determine which of the plurality of outdoor lighting apparatuses 101 affect the illumination of the monitored area. The lighting controller 330 can then control lighting parameters of only the outdoor lighting apparatuses 101 that affect the illumination of the monitored area, rather than controlling all the outdoor lighting apparatuses 101 to have the new illumination conditions. As described above, the lighting controller 330 can either directly or indirectly control the relevant outdoor lighting apparatuses 101.

In other words, in the situation shown in FIG. 3, with the camera 201 to the right the monitored area will be primarily illuminated by outdoor lighting apparatuses 101c, and 101d. Hence, at step S4, the lighting controller 330 may determine based on the light location information with the surveillance imaging device location information that lighting parameters of the outdoor lighting apparatuses 101c and 101d need to be changed.

In some embodiments, the user of the surveillance system (e.g. a law enforcement professional) may be watching the images displayed on the display 310 and may see that there is a certain object or event within the displayed images that is important. In such circumstances, the user of the surveillance system may wish to improve the image quality of the portion of the displayed images that contain the certain object or event.

For example, as shown in FIG. 4, there are four outdoor lighting apparatuses 101a, 101b, 101c, and 101d, and a camera 201. As shown in FIG. 4, the camera 201 is facing to the right and so the monitored area will be primarily illuminated by outdoor lighting apparatuses 101c, and 101d. Between the outdoor lighting apparatuses 101c, and 101d in FIG. 4, there is a crowd of people 501.

The crowd of people 501 may be in the monitored area and therefore may be captured by the camera 201 and viewed on the display 310. The user of the surveillance system may wish to improve the image quality of the portion of the images containing the crowd of people 501.

In order to maximise the image quality of the crowd of people 501 within the displayed images on the display 310, the image processor 320 can, in this embodiment, be arranged to select a portion of the image data of each frame containing the crowd of people 501. The image processor 320 can then in step S3 obtain the image quality parameter for each frame based only on the portion of the image data.

Furthermore, as also shown in FIG. 4, between the outdoor lighting apparatuses 101a, and 101b, there is an emergency services vehicle 502. The camera 201 may be rotated so that the emergency services vehicle 502 is in a new monitored area and therefore may be captured by the camera 201 and viewed on the display 310. As for the crowd 501, the user of the surveillance system may wish to improve the image quality of the portion of the images containing the emergency services vehicle 502, and therefore may manually select a portion of the displayed image containing the emergency services vehicle 502.

In general terms, the crowd 501 or the emergency services vehicle 502 represent objects of interest within the displayed images. The portion of the displayed images that includes the object of interest may be manually selected by the user of the surveillance system 10, e.g. using a suitable user interface (not shown) associated with the display 301.

In other embodiments, in step S3, the image processor 320 may be arranged to analyse the current frame of the image data to detect if there is an object of interest (e.g. a crowd) in a current frame. If an object of interest is detected in the current frame, a portion of the current frame comprising the object of interest is then selected by the image processor 320 as the portion of the image data for obtaining the image quality parameter. In other words, in step S3, only the portion of the image data that comprises the object of interest is used to obtain the image quality parameter.

The object of interest could be any one or combination of:
Crowd
Suspicious person/object
Emergency situation
Infrastructure (e.g. street, tree, building, monument, light pole, traffic lights);
Object (e.g. table, chair, bench, bin, suit case, car)
Subject (e.g. human, dog, bird)
Event or situation (e.g. street fight, car crash, explosion, fire, vandalism)

It will be appreciated that there are numerous object recognition algorithms that can be used by an image processor to detect the presence of certain objects within an image. For example, algorithms to detect crowds of people or suspicious persons are well known.

An example operation of such an embodiment is shown in FIG. 7. This shows an example image 600a as may be displayed on the display 310. In this example, it is assumed that object 601a (i.e. represented by the triangle) is an object of interest. This could be manually selected or selected via a suitable algorithm. In either case, a box 602 is obtained around the object 601a. In this example, the image quality parameter is only obtained based on pixels within the box. As a result, the illumination of the monitored area can be changed, resulting in the improved (e.g. better contrast) image 600b showing the object 601b.

Furthermore, the system may be arranged so that the illumination of just an area included in the selected portion of the image (i.e. not the whole monitored area shown in image 600a) is changed. This can be done by considering which of the outdoor lighting apparatuses 101 illuminate the selected portion of the image 600a. This is discussed more below in relation to FIG. 8.

It will be appreciated that dependent on day/night rhythm, the light levels of the outdoor lighting system 100 may be adjusted on a certain pre-programmed minimal level (as required by regulations), for instance: average illumination (Eav) of 3.0 Lux, an uniformity of 0.2 lux and a minimum horizontal illuminance (Eh) of 0.6 lux.

Dependent on the activity level on a street, e.g. if the image processor 320 can automatic detect this activity level (e.g. number of people present, number of vehicle movements) the light levels can be raised to a higher level, for instance average illumination (Eav) of 7.0 Lux, an uniformity of 0.2 and a minimum horizontal illuminance (Eh) of 1.5 lux.

In case of an emergency (e.g. detected by the image processor 320 or manually alerted or from another data source, e.g. 112-call centre), very locally the light level may be boosted to maximum, for instance: average illumination (Eav) of 15.0 Lux, an uniformity of 0.2 and a minimum horizontal illuminance (Eh) of 3.0 lux.

In case of moonshine the light levels can be reduced, making use of the overall lit environment by the moon light, very locally the light levels can be higher to distinguish objects.

As shown in FIGS. 5a and 5b, there are four outdoor lighting apparatuses 101a, 101b, 101c, and 101d, and a camera 201. There is a suspicious person 503 that is shown in two different positions in FIGS. 5a and 5b.

As shown in FIG. 5a, the camera 201 is facing to the right and directed at the suspicious person 503 and so the monitored area will be primarily illuminated by outdoor lighting apparatuses 101c, and 101d.

Using a suitable detection algorithm, during step S3, the image processor 320 may detect the suspicious person 503 in the images displayed on the display 310. The image processor 320 may then select a portion of the image containing the suspicious person 503 and change the illumination of this area to improve the image quality of this portion.

As shown in FIG. 5b, the suspicious person 503 has moved to between the outdoor lighting apparatuses 101b, and 101c in FIG. 5b. Hence, the new monitored area will be primarily illuminated by outdoor lighting apparatuses 101b, and 101c.

For example, the camera 201 may track a person 503 (e.g. an individual or group) through the street. In normal situations the front of the person 503 will not be lit when he/she walks from outdoor lighting apparatus 101c towards outdoor lighting apparatus 101b. There is a lot of light at the back of the person 503, no to only very little light towards his/her face/front. Hence, only a contour is visible to the camera 201. In some cases this is good, e.g. when it is desired to keep track of an individual, so in some cases it is desired to have more light from the back, than from the front of the individual. This principle of increasing the lighting contrast is a known principle for tunnel lighting. While walking, the different outdoor lighting apparatuses may increase/decrease the light level according the position of the person 503.

In other cases, the observer of the display 310 may want to detect/see the face/color of clothes, etc. of the person 503. In that case more lighting is needed from the front than from the back. In addition, a different spectral distribution may be needed to identify the pedestrian, different light qualities (e.g. more yellow/blue or orange in the light) will help to better distinguish skin, hair and clothing colors. Hence, if a person 503 is detected, in some embodiments, each outdoor lighting apparatus 101 in the region of the person is arranged to provide a plurality of different lighting conditions, depending on different lighting parameters. In such embodiments, the lighting controller 330 can be arranged to control the outdoor lighting apparatuses 101 to periodically cycle through the different lighting conditions so as to provide different illumination conditions for the monitored area. This can be done independently of the above mentioned image processing and lighting control to improve image quality.

As shown in FIG. 6a, there are four outdoor lighting apparatuses 101a, 101b, 101c, and 101d, and a camera 201. As shown in FIG. 6a, the camera 201 is facing to the right and so the monitored area will be primarily illuminated by outdoor lighting apparatuses 101c, and 101d. Between the outdoor lighting apparatuses 101c, and 101d in FIG. 6a, there is a snowy area 504.

As also shown in FIG. 6b, between the outdoor lighting apparatuses 101a, and 101b, there is rainy area 505. The camera 201 may be rotated so that the rain 505 is in a new monitored area and therefore may be captured by the camera 201 and viewed on the display 310. As for the snowy area 504, the user of the surveillance system may wish to improve the image quality of the portion of the images containing the rainy area 505, and therefore may manually select a portion of the displayed image containing the rainy area 505.

Dependent on the current weather, e.g. detected by sensors in the outdoor lighting apparatuses, or for other data source (real-time weather data base), the light locally may be adjusted to increase the visibility by the camera 201.

In case of rain there may be a lot of reflections from wet surfaces, especially from the street (wet tiles, puddles), and the camera image will be heavily affected by it. By adding/adjusting specific light spectra—for instance a single small band width of light (e.g. yellow 580 nm) it can make it easier to distinguish the lit objects from the background.

In case of snow there is extreme reflection of light and reduced light levels from specific light outdoor lighting apparatuses 101 can help to improve contrast. Also adjusted spectra can help to better detect/track objects.

The case of reflections from rain will be illustrated with reference to FIG. 8. This shows an example image 700a as may be displayed on the display 310. In this example, it is assumed that lighter region 701 in the image 700a is a bright spot caused by glare from a puddle from a specific outdoor lighting apparatus 101. In this embodiment, in step S3, it may be detected that there is the bright spot 701 in the image 700a that was not previously there. It may also be determined (either through a light map of the locations/angles of the outdoor lighting apparatuses 101 or by trial and error) which outdoor lighting apparatus 101 is causing that reflection. As a result, the system can reduce the illumination of the outdoor lighting apparatus 101 in the monitored area of the image 700a causing the bright spot 701, e.g. by controlling that outdoor lighting apparatus 101 to rotate to the different orientation or by reducing its light output. This would lead to an improved image 700b.

Alternatively, on detection of the bright spot 701 (e.g. in conjunction with weather data indicating rain), the outdoor lighting apparatuses 101 could be controlled to change or reduce the wavelength of the light output by the relevant outdoor lighting apparatuses 101.

Hence, in the arrangement shown in FIG. 8, the system is arranged so that the illumination of just an area included in the selected portion of the image (i.e. not the whole monitored area shown in image 700*a*) is changed, by considering which of the outdoor lighting apparatuses 101 illuminate the selected portion of the image 700*a*.

In addition, the methodology discussed above could be used to illuminate dark spots in the images. For example, dark spots might be caused by spatial distribution of light sources and cameras, weather (e.g. cloudiness), shadows from infrastructure (e.g. building, trees), objects (cars) or subjects (e.g. crowd). Such dark spots could be detected, and then compensated for by the lighting apparatuses.

As mentioned above, embodiments of the invention can provide a control system for a surveillance system in which an image processor can analyse image data received from a surveillance imaging device (e.g. including a video camera or the like) to determine the image quality of the images (e.g. those displayed in a control room). This information can be used by the lighting controller to control the outdoor lighting apparatuses so as to improve the image quality of the images. It will be appreciated that changing the lighting conditions for an area may cause the surveillance imaging device (e.g. a camera) to change its capturing parameters (e.g. which may be automatically controlled via an algorithm). Hence, the lighting controller may control the outdoor lighting apparatuses so as to change the parameters of the surveillance imaging device (e.g. a camera).

In general terms, embodiments of the invention can provide a surveillance system including a plurality of outdoor lighting apparatuses (e.g. forming an outdoor lighting system), a surveillance imaging device (e.g. a video camera) and a control system. It will be appreciated that the elements of the control system (e.g. the image processor and the controller) may be provided on a single apparatus (e.g. a server or general purpose computer) or as part of a distributed arrangement. For example, the control system may include one or more computers in communication. In some embodiments, the control system may comprise a display. In other embodiments, the control system may be separate from the display.

The above embodiments as described are only illustrative, and not intended to limit the technique approaches of the present invention. Although the present invention is described in detail referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A surveillance system comprising a lighting system comprising a plurality of lighting apparatuses including one or more lights; a surveillance imaging device arranged to capture image data of a monitored area illuminated by one or more of the lighting apparatuses; and a control system comprising:
an image processor arranged to receive the image data from the surveillance imaging device, wherein the image data comprises a plurality of frames, and wherein the image processor is arranged to analyse each frame of the image data to obtain an image quality parameter for each frame;
a controller arranged to determine a difference between a value of the image quality parameter for a current frame and a reference value of the image quality parameter, wherein if said difference is greater than a threshold value the controller is arranged to repeat a process of:
sending to the lighting system control information for controlling a lighting parameter of at least one of the plurality of lighting apparatuses so as to change illumination of the monitored area; and
determining a new difference between a value of the image quality parameter for a new current frame and the reference value of the image quality parameter;
wherein the process is repeated until said new difference is less than or equal to a threshold value; and
wherein the image processor arranged to receive information on a selection of a portion of the image data of each frame, and wherein the image processor is arranged to obtain the image quality parameter for each frame based only on the portion of the image data.

2. The surveillance system according to claim 1, wherein the surveillance system is arranged to store light location information comprising the location of the area illuminated by each respective lighting apparatus and surveillance imaging device location information comprising information on the location of the monitored area;
wherein the controller is arranged to compare the light location information with the surveillance imaging device location information to determine which of the plurality of lighting apparatuses affect the illumination of the monitored area;
wherein the controller is arranged to send to the lighting system control information for controlling a lighting parameter of at least one lighting apparatus that affects the illumination of the monitored area.

3. The surveillance system according to claim 1, wherein the image quality parameter comprises at least one of: a brightness value; a contrast value; a color balance value; and a shadow-contrast point value, a sharpness value, a noise value, a dynamic range value, a tone reproduction value, a color accuracy value, a distortion value, an exposure accuracy value, a value indicative of lens flare.

4. The surveillance system according to claim 1, wherein the lighting parameter comprises a control parameter arranged to control the one or more lights of a lighting apparatuses, wherein the lighting parameter is arranged to change at least one of: the overall light output; the beam shape of the light output; the color spectrum distribution of the light output; the flicker frequency.

5. The surveillance system according to claim 1, wherein the reference value of the image quality parameter is a value of the image quality parameter representing a previous frame.

6. The surveillance system according to claim 5, wherein the value of the image quality parameter representing a previous frame comprises an average value of the image quality parameter for a predetermined number of previous frames.

7. The surveillance system according to claim 1, wherein the image processor is arranged to receive a user selection of the portion of the image data.

8. The surveillance system according to claim 1, wherein the image processor is arranged to analyse the current frame of the image data to detect if there is an object of interest in the current frame;
   wherein if an object of interest is detected in the current frame, a portion of the current frame comprising the object of interest is selected by the image processor as the portion of the image data for obtaining the image quality parameter;
   wherein if the object of interest moves within a number of subsequent frames, the image processor is arranged to select a new portion for each frame comprising the region of interest.

9. The surveillance system according to claim 1, wherein if said difference, between a value of the image quality parameter for a current frame and a reference value of the image quality parameter, is greater than a threshold value the controller is arranged to send to the lighting system control information for controlling a lighting parameter of at least one lighting apparatus that affects the illumination of an area corresponding to a selected portion of the image data.

10. The surveillance system according to claim 1 wherein the plurality of lighting apparatuses are a plurality of outdoor lighting apparatuses.

11. A surveillance system comprising a lighting system comprising a plurality of lighting apparatuses including one or more lights; a surveillance imaging device arranged to capture image data of a monitored area illuminated by one or more of the lighting apparatuses; and
   a control system comprising:
      an image processor arranged to receive the image data from the surveillance imaging device, wherein the image data comprises a plurality of frames, and wherein the image processor is arranged to analyse each frame of the image data to obtain an image quality parameter for each frame;
      a controller arranged to determine a difference between a value of the image quality parameter for a current frame and a reference value of the image quality parameter, wherein if said difference is greater than a threshold value the controller is arranged to repeat a process of:
      sending to the lighting system control information for controlling a lighting parameter of at least one of the plurality of lighting apparatuses so as to change illumination of the monitored area; and
      determining a new difference between a value of the image quality parameter for a new current frame and the reference value of the image quality parameter;
      wherein the process is repeated until said new difference is less than or equal to a threshold value, and
   wherein each lighting apparatus is arranged to provide a plurality of different lighting modes, and wherein the controller is arranged to send to the lighting system control information for controlling the lighting apparatuses to periodically cycle through the different lighting modes so as to provide different illumination conditions for the monitored area.

12. A method of controlling a surveillance system comprising a plurality of lighting apparatuses comprising one or more lights, a surveillance imaging device, an image processor, and a controller; the method comprising:
   using the surveillance imaging device to capture image data of a monitored area illuminated by one or more of the lighting apparatuses;
   at the image processor, receiving the image data comprising a plurality of frames from the surveillance imaging device, and analysing each frame of the image data to obtain an image quality parameter for each frame;
   using the controller to determine a difference between a value of the image quality parameter for a current frame and a reference value of the image quality parameter, wherein if said difference is greater than a threshold value the controller is arranged to repeat a process of:
   controlling a lighting parameter of at least one of the plurality of lighting apparatuses so as to change illumination of the monitored area; and
   determining a new difference between a value of the image quality parameter for a new current frame and the reference value of the image quality parameter;
   until said new difference is less than or equal to a threshold value; and
   wherein the image processor received information on a selection of a portion of the image data of each frame, and wherein the image processor obtains the image quality parameter for each frame based only on the portion of the image data.

13. A computer readable non-transitory medium having stored therein instructions for causing a processor of a user device unit to execute a method for controlling a surveillance system, the surveillance system including a lighting system having a plurality of lighting apparatuses including one or more lights, a surveillance imaging device arranged to capture image data of a monitored area illuminated by one or more of the lighting apparatuses and a control system, the medium comprising code for:
   an image processor arranged to receive the image data from the surveillance imaging device, wherein the image data comprises a plurality of frames, and wherein the image processor is arranged to analyse each frame of the image data to obtain an image quality parameter for each frame;
   a controller arranged to determine a difference between a value of the image quality parameter for a current frame and a reference value of the image quality parameter, wherein if said difference is greater than a threshold value the controller is arranged to repeat a process of:
   sending to the lighting system control information for controlling a lighting parameter of at least one of the plurality of lighting apparatuses so as to change illumination of the monitored area; and
   determining a new difference between a value of the image quality parameter for a new current frame and the reference value of the image quality parameter;
      wherein the process is repeated until said new difference is less than or equal to a threshold value; and
   wherein the image processor arranged to receive information on a selection of a portion of the image data of each frame, and wherein the image processor is arranged to obtain the image quality parameter for each frame based only on the portion of the image data.

* * * * *